Patented May 27, 1924.

1,495,547

UNITED STATES PATENT OFFICE.

DAY F. CLARK, OF HARRISBURG, PENNSYLVANIA.

CHEMICAL COMPOUND FOR REMOVING BAKED ENAMEL PAINT.

No Drawing.   Application filed May 26, 1923.   Serial No. 641,763.

*To all whom it may concern:*

Be it known that I, DAY F. CLARK, citizen of the United States, residing at Harrisburg, in the county of Dauphin and State of Pennsylvania, have invented certain new and useful Improvements in Chemical Compounds for Removing Baked Enamel Paint, of which the following is a specification.

The object of my invention is to provide a chemical compound for removing baked enamel paint from metal surfaces, such as the metallic parts of automotive vehicles. The baked enamel presents a hard, glazed surface, which resists the attack of ordinary paint-removers now on the market, and, as a matter of fact, such ordinary paint-removers are not intended to be used to remove baked enamel from metallic surfaces, but to remove air-dried paint and varnish.

It is customary, to remove baked enamel, particularly enamel which is baked under high temperatures, to laboriously chip it off; but my compound may be applied with a brush and will adhere to the enameled surface and be permitted to remain for from fifteen minutes to two hours, depending upon the temperature at which the enamel was baked, whereupon the enamel may be easily brushed off.

As the result of many experiments conducted with many chemicals, I have found that the best results are obtained from a mixture of chemical ingredients (or their equivalents) as follows, in the proportions mentioned: To every hundred parts, by measure: 20 parts of methyl acetone, 20 parts of denatured alcohol, 10 parts of aqua ammonia (of 26° to 32°), 10 parts ammonium carbonate, 15 parts of benzol, 10 parts of xylol, 5 parts of a waxy body miscible in the benzol (such waxy body being, preferably, paraffin wax), 5 parts of celluloid chips, and 5 parts of soap.

The mixture of these ingredients is accomplished as follows: The benzol, xylol, and methyl acetone are boiled, and the wax and celluloid are stirred in until thoroughly incorporated. The mixture, thus far made, is then permitted to cool. After cooling, the denatured alcohol is added. Finally, the ammonia is added. It may be mentioned that the purpose of the celluloid and the wax is to give a viscous consistency to the mass and prevent evaporation of the volatile constituents.

I have demonstrated that, by the use of my compound applied to enamel baked at even the highest temperatures, the enamel may be removed easily within a period of time not exceeding two hours after application of the compound, and that enamel baked at lower temperatures may be removed with ease anywhere from fifteen minutes to less than two hours.

Another advantage of my compound is that it does not contain any caustic or free acid, and is not injurious to the clothing or the skin of the person using the compound.

While I have given above the preferred proportions of the ingredients, it may be stated that the proportions may be varied as much as 10% to 20%, without materially affecting the value of the compound.

Having thus described my invention, I claim as new:

1. A compound for removing baked enamel paint, comprising the following ingredients, in substantially the following proportions, by measure: 20 parts of methyl acetone, 20 parts of denatured alcohol, 10 parts of aqua ammonia of 26° to 32° strength, 10 parts of ammonium carbonate, 15 parts of benzol, 10 parts of xylol, 5 parts of celluloid chips, 5 parts of soap, and 5 parts of a waxy constituent miscible in the benzol.

2. A compound for removing baked enamel paint, comprising the following ingredients, in substantially the following proportions, by measure: 20 parts of methyl acetone, 20 parts of denatured alcohol, 10 parts of aqua ammonia of 26° to 32° strength, 10 parts of ammomium carbonate, 15 parts benzol, 10 parts of xylol, 5 parts of celluloid chips, 5 parts soap, and 5 parts of paraffin wax.

In testimony whereof, I affix my signature.

DAY F. CLARK.